Patented Oct. 8, 1946

2,408,833

UNITED STATES PATENT OFFICE 2,408,833

STEROIDAL COMPOUNDS AND METHODS FOR OBTAINING THE SAME

Romeo B. Wagner, State College, Pa., assignor to Parke, Davis & Company, Detroit, Mich., a corporation of Michigan No Drawing. Application May 15, 1944, Serial No. 535,757

9 Claims. (Cl. 260—239.5)

This invention relates to the preparation of new pseudo-sapogenins from new steroidal sapogenins some of which are described in my copending application, Serial No. 530,758, filed May 15, 1944. (See also J. Am. Chem. Soc. 65, 1199 (1943).) These compounds are valuable as intermediates for the preparation of hormones of the sex hormone type and particularly of the adrenal cortex hormone type since they are oxygenated at position 12 of the steroid nucleus.

The reaction by which steroidal sapogenins are isomerized to the pseudo-genins have been described in detail in the copending Patents Nos. 2,352,848 and 2,352,852, issued July 4, 1944. These also include proof of structure of the pseudo-genin side chain.

This invention relates to the preparation of pseudo-genins having the formula

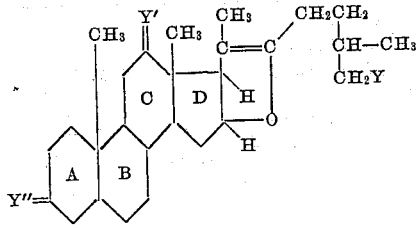

where Y″ is

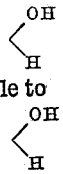

or a group hydrolyzable to

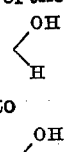

where Y′ is a member of the class

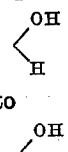

groups hydrolyzable to

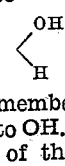

and =O and Y is a member of the class OH and groups hydrolyzable to OH.

Specific examples of this type compound are pseudo-hecogenin in which Y′ at 3 is

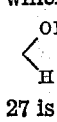

Y′ at 12 is =O, Y at 27 is —OH, and the configuration at C-5 is "allo." In pseudo-hecogenin diacetate both hydroxyls are acylated by acetyl groups. Similarly pseudo-rockagenin has the allo configuration at C-5 and hydroxyls at 3, 12 and 27. Pseudo-furcogenin is, however, of the "regular" configuration at C-5 and carries hydroxyls at C-3 and 27 with a ketone group at C-12.

The invention may be illustrated by the following example:

*Pseudohecogenin.*—A sealed tube containing 5 g. of hecogenin and 15 cc. of acetic anhydride was heated at 200° for 10 hours. The solvent was removed in vacuo and the solid residue was treated with a solution of 5 g. of potassium hydroxide in 500 cc. ethanol for thirty minutes. The product was ether extracted and the ethereal solution was washed and evaporated. The acetone solution of the residue after treatment with Norite was concentrated and cooled to give white needles, M. P. 189–191°; yield 2.6 g.

Anal.: Calc'd for $C_{27}H_{42}O_4$: C, 75.3; H, 9.8. Found: C, 75.2; H, 9.9.

While for ease of manipulation and economy the preferred isomerizing agent is acetic anhydride other lower aliphatic acid anhydrides may also be used. The preferred temperature range lies between 190° and 200° C. although the reaction also takes place as low at 170° or as high as 230°. The example is intended as illustrative and the invention is not necessarily limited to the conditions and reactants therein cited.

The above mentioned transformations can be illustrated diagrammatically as follows:

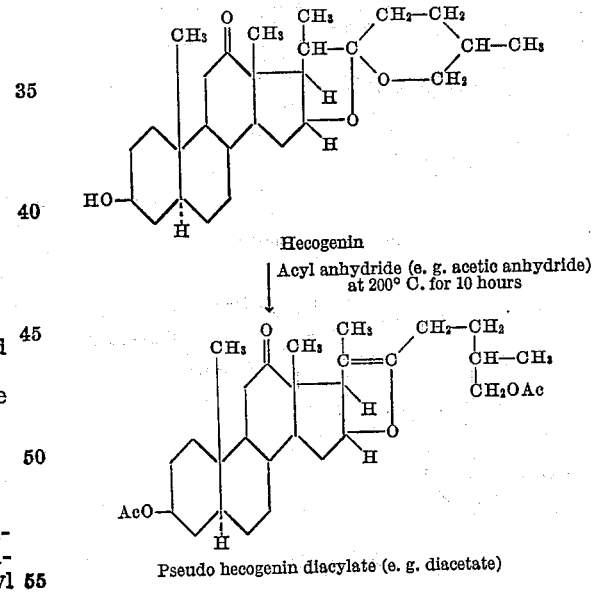

Hecogenin

Acyl anhydride (e. g. acetic anhydride) at 200° C. for 10 hours

Pseudo hecogenin diacylate (e. g. diacetate)

3

↓ Alkaline hydrolysis

Pseudo hecogenin

Rockogenin

↓ Acyl anhydride (e. g. acetic anhydride) at 200° C. for several hours.

Pseudo-rockogenin triacylate (e. g. triacetate)

↓ Alkaline hydrolysis

Pseudo-rockogenin

Furcogenin

4

↓ Acyl anhydride (e. g. acetic anhydride) at 200° C. for about 10 hours.

Pseudo-furcogenin diacylate (e. g. diacetate)

↓ Alkaline hydrolysis

Pseudo-furcogenin

In addition to using ethanolic KOH solution for hydrolyzing the acylated pseudogenin to the free genin, one can use any other suitable alkaline solution, for example one containing NaOH, $K_2CO_3$, $KHCO_3$, $Na_2CO_3$, $NaHCO_3$ or the like. If an alcohol is required to aid hydrolysis, this can be methanol or other lower aliphatic alcohol instead of ethanol.

What I claim is:

1. A pseudo-sapogenin compound of the formula where Y and Y'' are members of the class $$\begin{matrix} & OH \\ & \diagup \\ & \diagdown \\ & H \end{matrix}$$

and groups hydrolyzable to $$\begin{matrix} & OH \\ & \diagup \\ & \diagdown \\ & H \end{matrix}$$

and Y' is a member of the class O, $$\begin{matrix} & OH \\ & \diagup \\ & \diagdown \\ & H \end{matrix}$$

and groups hydrolyzable to $$\begin{matrix} & OH \\ & \diagup \\ & \diagdown \\ & H \end{matrix}$$

2. A pseudo-sapogenin compound of the formula

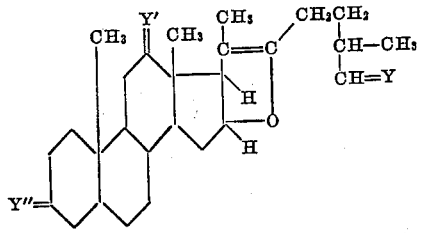

where Y, Y' and Y'' are each members of the class

and groups hydrolyzable to

3. A pseudo-sapogenin compound of the formula

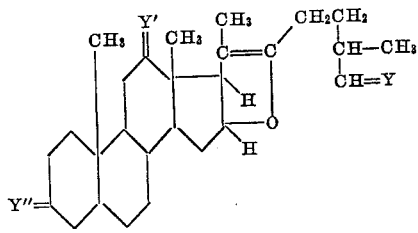

where Y and Y'' are each members of the class

and groups hydrolyzable to

and Y' is a ketone oxygen group.

4. A pseudo-hecogenin compound of the formula,

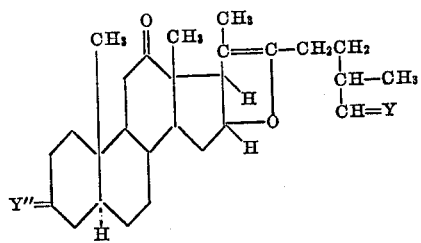

where Y and Y'' are members of the class

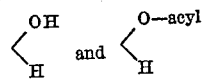

5. A pseudo-rockogenin compound of the formula,

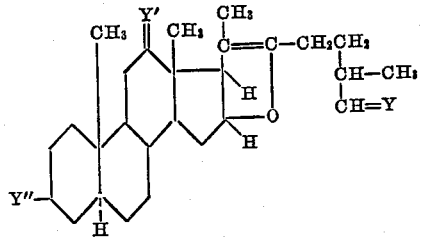

where Y, Y' and Y'' are members of the class

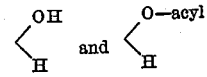 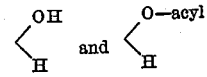

6. A pseudo-furcogenin compound of the formula,

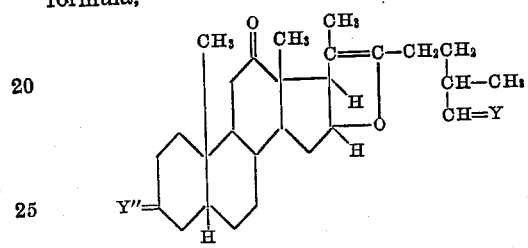

where Y and Y'' are members of the class

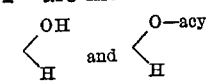 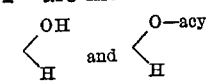

7. Pseudo-hecogenin having the formula,

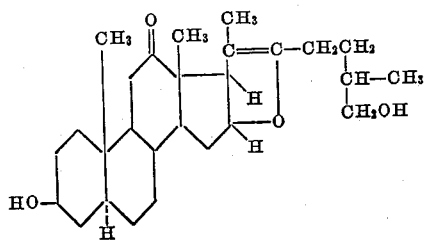

8. Pseudo-rockogenin having the formula,

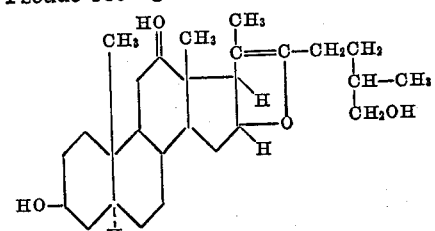

9. Pseudo-furcogenin having the formula,

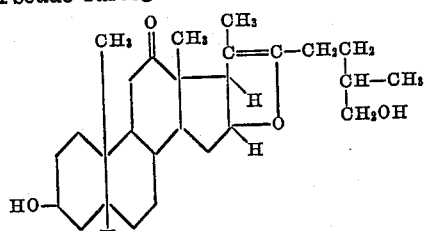

ROMEO B. WAGNER.